US008676717B2

(12) United States Patent
Tigali et al.

(10) Patent No.: US 8,676,717 B2
(45) Date of Patent: Mar. 18, 2014

(54) PSYCHOMETRIC ANALYSIS TOOL FOR PREDICTING THE RENEGE RATE

(75) Inventors: Mallesh Tigali, Bangalore (IN); Abhishek Dasgupta, Tamil Nadu (IN)

(73) Assignee: Accenture Global Services Limited, Dublin (IE)

( * ) Notice: Subject to any disclaimer, the term of this patent is extended or adjusted under 35 U.S.C. 154(b) by 1718 days.

(21) Appl. No.: 11/512,419

(22) Filed: Aug. 30, 2006
(Under 37 CFR 1.47)

(65) Prior Publication Data
US 2008/0027770 A1    Jan. 31, 2008

(51) Int. Cl.
*G06Q 10/00* (2012.01)
(52) U.S. Cl.
USPC .......................................... 705/321; 705/7.38
(58) Field of Classification Search
USPC ................ 705/7, 8, 7.11, 7.12, 7.38, 321
See application file for complete search history.

(56) References Cited

U.S. PATENT DOCUMENTS

| | | | | |
|---|---|---|---|---|
| 5,918,209 A | * | 6/1999 | Campbell et al. | 705/5 |
| 2002/0128894 A1 | * | 9/2002 | Farenden | 705/8 |
| 2003/0037032 A1 | * | 2/2003 | Neece et al. | 707/1 |
| 2003/0061080 A1 | * | 3/2003 | Ross | 705/6 |
| 2003/0065542 A1 | * | 4/2003 | Gliozzi et al. | 705/7 |
| 2005/0125259 A1 | * | 6/2005 | Annappindi | 705/4 |
| 2005/0278244 A1 | * | 12/2005 | Yuan | 705/37 |
| 2008/0027770 A1 | * | 1/2008 | Tigali et al. | 705/7 |

OTHER PUBLICATIONS

Strategies for Reducing Missed Initial Appointments in a Community Mental Health Center—by Miriam P. Kliger, Ph. D. and Athan Karras, Ph. D. Community Mental Health Journal, vol. 19 No. 2, Summer 1983—pp. 137-143.*
Patient Transfer from One Clinician to Another and Dropping-Out of Out-Patient Treatment—by D. Tantam and G. Klerman Social Psychiatry 14, 107-113 (1979).*
Subjective Performance Measures in Optimal Incentive Contracts— by George Baker et al. National Bureau of Economic Research Sep. 1993.*

* cited by examiner

*Primary Examiner* — Andre Boyce
*Assistant Examiner* — Ernest A Jackson
(74) *Attorney, Agent, or Firm* — Finnegan, Henderson, Farabow, Garrett & Dunner, LLP

(57) ABSTRACT

Embodiments of the present invention provide a renege reducing hiring method. Other embodiments of the present invention provide a renege factor evaluation method. Other embodiments of the present invention provide an organizational renege reduction method. Other embodiments of the present invention provide a candidate renege prediction method in accordance with embodiments of the present invention. An still other embodiments of the present invention provide a psychometric analysis tool for predicting the renege rate.

26 Claims, 5 Drawing Sheets

Figure 5

Renege Factor Evaluation tool
500

PSYCHOMETRIC ANALYSIS TOOL FOR PREDICTING THE RENEGE RATE

CROSS REFERENCE TO RELATED APPLICATIONS

This application claims priority to India Patent Application No. 1205/MUM/2006 filed on Jul. 29, 2006.

FIELD OF THE INVENTION

The present invention relates generally to a psychometric analysis tool for predicting the renege rate. Specifically, the present invention provides a tool and method for predicting with relative accuracy which employment applicants who, after accepting an employment offer, nevertheless elect to not join an organization.

BACKGROUND OF THE INVENTION

A certain percentage of employment candidates who receive and accept job offers, subsequently do not join the employing organization. In other words, a percentage of the candidates renege on the acceptance of a job offer, and these candidates who do not join the organization after accepting job offers are called "Reneges." A "Renege Rate" is then the percentage of applicants that do not join the organization after accepting a job offer. If, for example, a hundred candidates accept job offers and twenty of the same population then eventually does not join following their acceptances, the renege rate will be 20/100, or 20%.

In some industries, the renege rate can be quite significant. For example, in certain segments of the high technology service industries, the renege rate may exceed a third. A high renege significantly increases recruitment costs and efforts due to the potential need to fill the same position multiple times. The high renege rate may have other significant costs to the organization, including decreased client satisfaction and delayed project delivery caused by continued understaffing when hired employees renege.

An organization could increase hiring in response to a high renege, but this likewise has undesirable consequences. Primarily, even with a high renege rate, it is currently difficult for an organization to predict accurately the particular candidates that will renege. Effectively, an organization would need to over-hire with expectation that at least some of the hired employees would not join. While this method may work where employees have interchangeable job skills, many jobs positions require particular skills such that only particular individuals can perform the requisite tasks.

Currently, there are no available systems or methods directed toward predicting a renege rate. Specifically, no known hiring tools or methods address the issue of identifying candidates that are likely to renege acceptance of job offers.

Moreover, no current tools or methodology exist to assist an organization in identifying factors that are specific to a position or organization and that significantly impact the renege rate. Consequently, organizations are left with little guidance in selecting a course of action to address high renege rates.

SUMMARY OF THE INVENTION

Embodiments of the present invention provide a renege reducing hiring method. Specifically, the present invention provides a system and method for evaluating previous renegers using various demographic and employment factors, and then using these results to predict the likelihood that a candidate will renege.

Other embodiments of the present invention provide a renege factor evaluation method. Other embodiments of the present invention provide an organizational renege reduction method. Other embodiments of the present invention provide a candidate renege prediction method in accordance with embodiments of the present invention. An still other embodiments of the present invention provide a psychometric analysis tool for predicting the renege rate.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE PREFERRED EMBODIMENTS

Figure 1:
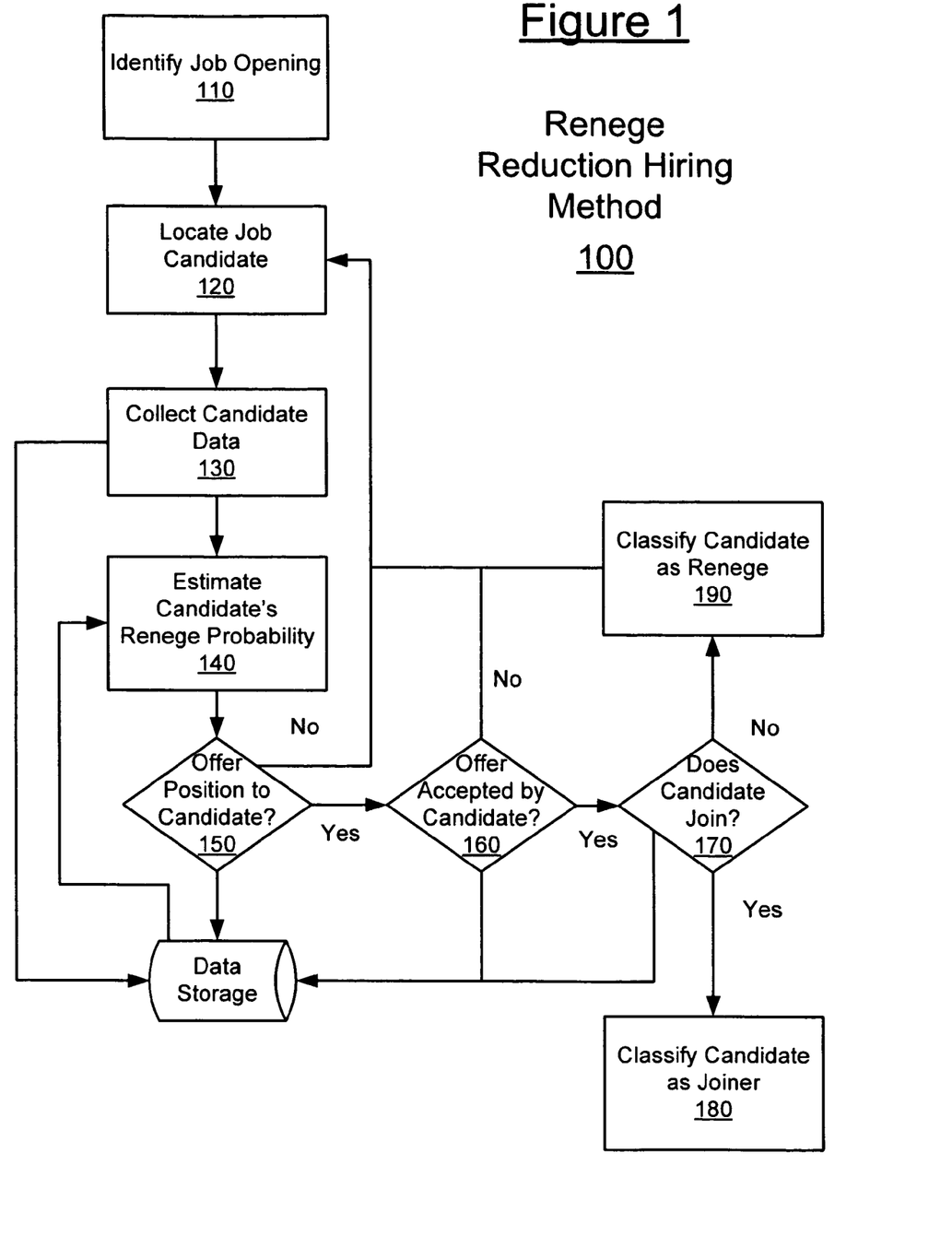
FIG. 1 is a flowchart illustrating the steps in a renege reducing hiring method in accordance with embodiments of the present invention.

Embodiments of the present invention provide a psychometric tool and method for accurately predicting candidates that will renege on the acceptance of a job offer. Turning now to FIG. 1, a candidate renege hiring method 100 is provided. Once a need to hire for a position arises in step 110, a candidate is identified in step 120 using standard hiring practices. Information about the candidate is then collected in step 130 to determine the values for various demographic and candidate factors used to predict the candidate's likelihood of reneging, as described in greater detail below. For example, the candidate may be interviewed or asked to fill out a questionnaire. The selection of the renege factors is described in greater detail below in FIG. 2 and the accompanying text.

The candidate's responses to the renege factor inquiries are stored in a database, along with the findings from other candidates and employees. The candidate may then be evaluated using the renege factor results in the step 140, and the evaluation typically entails running a statistical comparison of the candidate to prior reneges to predict the likelihood that the candidate, if offered a position and accepting of the offer, would eventually renege the acceptance. Specifically, the similarities and differences between the candidate and prior reneges is evaluated. The evaluation process is described in greater detail below. If the candidate is offered a position in step 150, then database is updated to reflect whether the candidate accepted the job in step 160 and whether the candidate joins the organization in step 170. Specifically, if the candidate joins or refuses to join after accepting the offer in step 160, the candidate is classified, respectively, as a joiner or a renege. If the candidate joins the organization, then the process stops. Otherwise, the process restarts in step 120 with a new candidate.

While not depicted, it should be appreciated that the database may be otherwise populated with data from other sources, such as public demographic data and information collected from competitors and other job openings. For example, reneges may be separately surveyed to better determine the cause of accepting another, alternate position.

Figure 2:
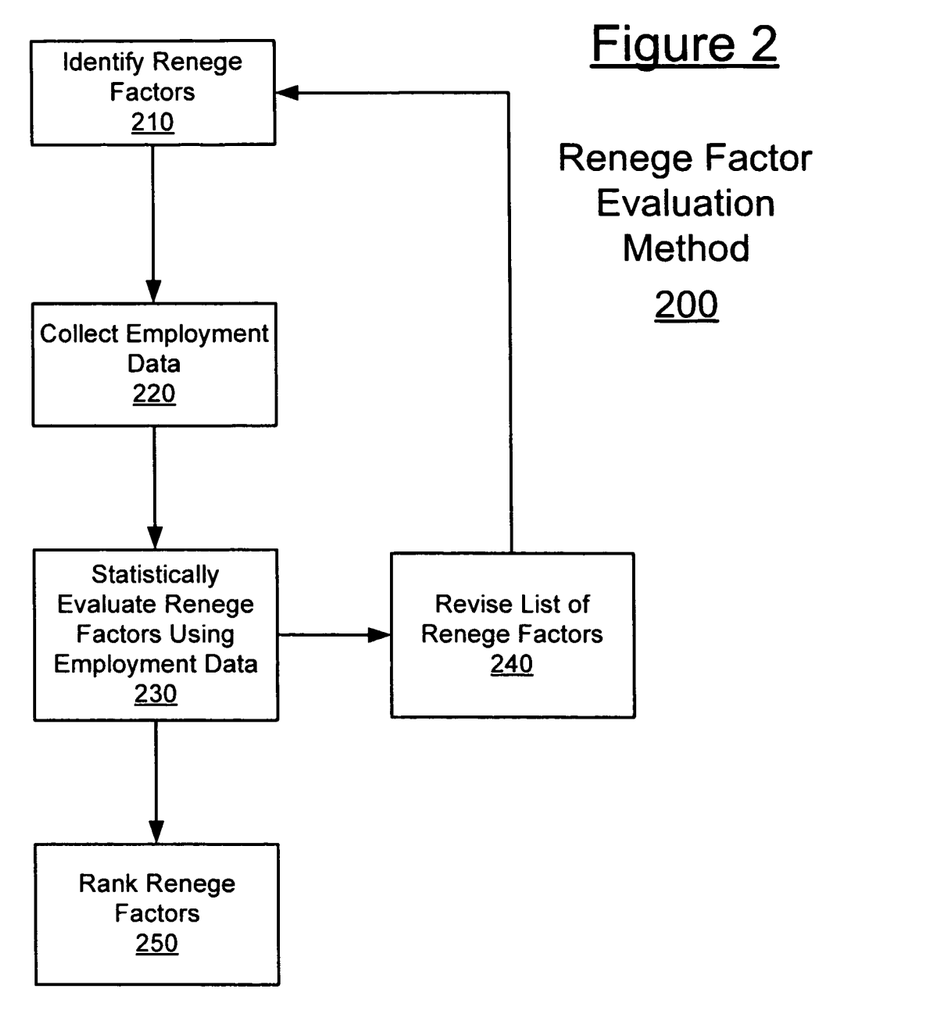
FIG. 2 is a flowchart illustrating the steps in a renege factor evaluation method in accordance with embodiments of the present invention.

Referring now to FIG. 2, embodiments of the present invention may dynamically decide and adjust the criteria collected in the screening and interview process 130, stored in the database 140, and used in the evaluated step 150 to assessing the candidates. Specifically, a renege factor evaluation method 200 includes the steps of identifying a list of renege factors in step 210. Often times, the process starts with a default, perhaps over-inclusive, set of factors to be evaluated in method 200. Otherwise, the renege factors may be user-defined. The next step is to collect employment data in step 220, as described above in the candidate renege evaluation method 100. This data typically include data on the selected factors for a number of previous reneges, as identified in step 190. In step 230, statistically evaluation of the accuracy of the renege factors in predicting the renege rate is performed. Specifically, each of the reneges and joiners is accessed vis-à-vis the renege factors specified in step 210. These results may then be used to revise the renege factor list in view of the statistical results of step 230, step 240. In this way, an organization can customize its renege analysis in view of its particular needs and pool of candidates. The renege factor evaluation method 200 may be carried out either continuously or in batch mode to determine the relative importance (and reliably) of the various factors in predicting the renege rate.

In a preferred embodiment, the various factors identified in step 210 are assessed against a set of renege (or joiners) using a chi-square distribution. In probability theory and statistics, the chi-square distribution (also chi-squared or $\chi^2$ distribution) is one of the theoretical probability distributions most widely used in inferential statistics, i.e. in statistical significance tests. It is useful because, under reasonable assumptions, easily calculated quantities can be proven to have distributions that approximate to the chi-square distribution if the null hypothesis is true.

The best-known situations in which the chi-square distribution is used are the common chi-square tests for goodness of fit of an observed distribution to a theoretical one, and of the independence of two criteria of classification of qualitative data. However, many other statistical tests lead to a use of this distribution. One example is Friedman's analysis of variance by ranks In the Chi-square test, as defined in Eq. 1, if $X_i$ are k independent, normally distributed random variables with means $\mu_i$ and variances $\sigma_i^2$, then the random variable $$Z = \sum_{i=1}^{k} \left(\frac{X_i - \mu_i}{\sigma_i}\right)^2 \qquad \text{(Eq. 1)}$$

is distributed according to the chi-square distribution. This is usually written $$Z \sim \chi_k^2. \qquad \text{(Eq. 2)}$$

The chi-square distribution, as suggested above in Eq. 1 and 2, has one parameter: k—a positive integer which specifies the number of degrees of freedom (i.e. the number of $X_i$)

In another embodiment, a t-test statistic is used to evaluate the various factors. A t-test is any statistical hypothesis test in which the test statistic has a Student's t distribution if the null hypothesis is true. T-tests are frequently used to determine whether as a test of the null hypothesis that the means of two normally distributed populations are equal. Given two data sets, each characterized by its mean, standard deviation and number of data points, one can use some kind of t-test to determine whether the means are distinct, provided that the underlying distributions can be assumed to be normal. There are different versions of the t test depending on whether the two samples are independent of each other (e.g., individuals randomly assigned into two groups), or paired, so that each member of one sample has a unique relationship with a particular member of the other sample, and in the present. Thus, the t-test will be used to determine which of the factors identified in step 210 is statistically related to the set of identified reneges.

In particular, values for a factor x in the test set (T) is compared to the values of the factor x in the control set (C). Then, the formula for a t-test is provided below in Eq. 3:

$$t = \frac{\bar{x}_T - \bar{x}_C}{\sqrt{\frac{\text{var}_T}{n_T} + \frac{\text{var}_C}{n_C}}} \qquad \text{(Eq. 3)}$$

or the difference in the mean value if x in sets T and C divided by the standard error of differences between sets T and C found using the variance (var) of the sets divided by the set sizes (n). The t-value t, along with other information, will indicate the statistical significance of the factor, and more specifically, whether the ratio is large enough to say that the difference between the groups is not likely to have been a chance finding. To test the significance, a risk level, also called the alpha level is set. In many applications, the alpha level is set to 0.05. This means that five times out of a hundred, a statistically significant difference is found between the means even if there was none. The user may also determine the degrees of freedom (df) for the test. In the t-test, the df is the sum of the persons in both groups minus 2. Given the alpha level, the df, and the t-value, one can determine whether significance, or p-value, is large enough for consideration. If it is, the difference between the means for the two groups is different, even given the variability between the two set.

If the p-value that is calculated is more than the threshold chosen for statistical significance (usually the 0.05 level), then the null hypothesis that the two groups do not differ is rejected in favor of the alternative hypothesis, which typically states that the groups do differ, and that the particular factor does accurately predict the reneges.

It should be appreciated that several t-tests are known, any of which may be used depending on the particular statistical characteristic of the sample sets. For example, the selection of the particular t-test may depend on whether the data points are normally distributed according to a normality test, such as Kolmogorov-Smirnov or Shapiro-Wilk, and whether the sample variances are equal can be assessed using Bartlett's test, Levene's test, or the Brown & Forsythe test. However, it is probably statistically conservative not to make this assumption since modern statistical packages make the test equally easy to do with or without this condition. It should be further appreciated that alternatives to the t-test are know and may be used. For example, if a non-parametric alternative to the t-test is needed, the usual choices are the Mann-Whitney U test for independent samples or either the binomial test or the Wilcoxon signed-rank test for related samples.

Examples of the factors collected in step 130 and defined in step 210 may include (1) demographic factors (such as age, sex, residence location, etc.) to the extent allowable under various employment laws; (2) candidate qualifications such as skill level, educational background, prior job experiences and previous compensation levels; (3) candidate-provided data regarding other available positions such as compensation or work conditions offered by other employers; (4) aspects of the recruitment process such as the number and duration of interviews or time delays in hiring; and (5) candidate job preferences such as desired work title and duties, desired work location, and desired compensation levels. It should be appreciated of course, that this list of factors is merely exemplary and is not intended to be exhaustive or otherwise precluding other factors as known in the field of staffing and recruitment such as the perception of the organization in the job market.

In a preferred implementation, the following factors are used in the evaluation of candidates for likelihood of reneging:
  Age
  Gender
  Skill Type (Standard or Premium)
  Career Level/Years of Experience
  Sourcing Channel (e.g., direct applicants versus applicants referred through search agencies)
  Previous Job Title
  Salary Index
  Distance of relocation
  High Education level
  Lead time to join (e.g., time between job acceptance and expected job start date)
  Number of organizations worked previously
  Distance between the location of the job interviewed and the location of the job position
  Family Background such as a number of siblings and age of parents As shown below to Table 1, it can be seen that all of these factors in studies have been found to statistically relevant to predicting reneges in a sample organization.

TABLE 1

| Profiling Head | p-value | Significant |
| --- | --- | --- |
| Gender | 0.002 | Yes |
| Channel | 0.000 | Yes |
| Career Level | 0.000 | Yes |
| Relocation | 0.000 | Yes |
| Migrated Joining Location | 0.000 | Yes |
| Skill | 0.000 | Yes |
| Education | 0.000 | Yes |
| Lead time to join | 0.000 | Yes |
| Age | 0.000 | Yes |
| Previous Orgn Tier | 0.000 | Yes |
| Salary Index | 0.000 | Yes |

Specifically, Table 1 shows that the null hypotheses (i.e., that the various identified factors have no relevance to reneges) have low or virtually no statistical accuracy in the historical sample set.

As suggested above in the factor evaluation method 200, the particular renege factors used to evaluate candidates may vary by organization. Similarly, the selected criteria may vary within an organization depending on the nature/level of a position. For example, different factors may be used with management and entry-level positions.

While not depicted, it should be appreciated that a similar analysis may be used to test the various factors by assessing the candidates that eventually join the organization. Specifically, the candidates that join the organization may be interviewed to determine various factors that lead the candidates to accept and honor job offers.

The statistical results from the renege factor evaluation method 200 may be used to rank the various factors, step 250. Specifically, the various factors can be ranked according to their statistical relevance or, more precisely, the statistical irrelevance (p value closest to 0) of the null hypotheses. For example, in tests of the present invention, it was found that the job duties and compensation where particularly important statistic causes for reneges. In other words, it was found that candidates were most likely to renege if offered a different job with greater compensation and/or more desirable job duties, and this conclusion is generally foreseeable.

The factors may be further subdivided, assessed and ranked in order to produce more meaningful renege analysis and comparison. Thus, each factor can be divided into more specific conditions a statistical analysis may be performed on each of the sub-factors. For example, it may be found that cross-country relocations are extremely relevant to the renege rate but that shorter relocations are much less so. Thus it may not be quite correct to say that a relocation requirement is an accurate predictor of reneges.

In a similar way, combination of factors may be evaluated as well to determine related factors or counterbalancing factors. Specifically, the expected impact may be evaluated by comparing the combination of factors to determine an overall p-value indicating an expected statistical importance to the renege rate. The evaluation of various combination of factors may be used, as described below, to better evaluate various courses of remedial action and candidates.

Figure 3:
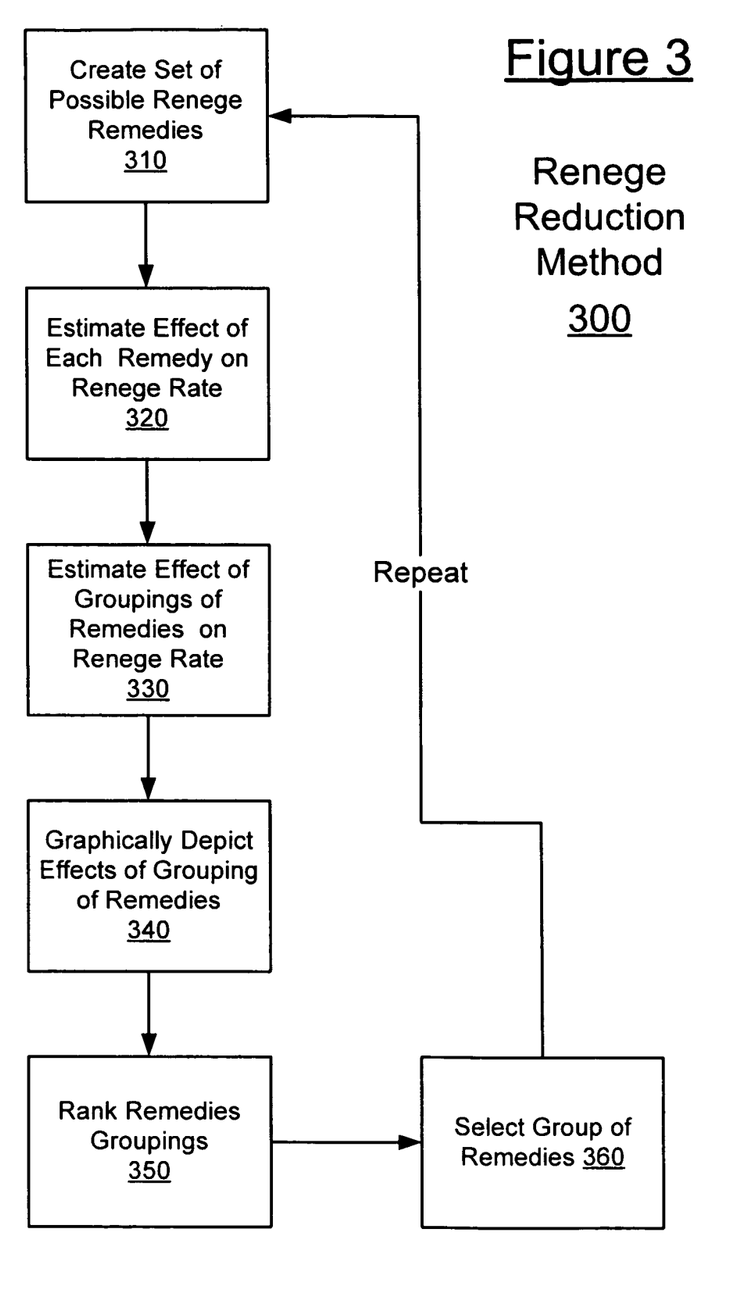
FIG. 3 is a flowchart illustrating the steps in an organizational renege reduction method in accordance with embodiments of the present invention.

Referring now to FIG. 3, a renege reduction method 300 is provided. Specifically, possible remedies to lower the renege are determined in step 310. For example, it may be possible to make a position more attractive by offering increased salary or benefits, allowing employees to telecommute, decreasing work hours, paying increased relocation costs, improving job duties, improving job security/safety, etc. Alternatively, it may be possible to increase the costs of a renege to an applicant, such as by attempting to collect monetary damages from a renege's breach of contract. The absolute effects of the each of the possible courses of action are then estimated using statistical analysis, step 320. For example, the effects of decreasing the costs of relocation can be estimated by statistically evaluating the current renege rate effects for shorter commutes. It should further be appreciated that a recursive process, such as described above for the renege factor evaluation method 200, may be used to assess to courses of action in step 320. For example, an initial estimate of the effects can be made using historical records, and the effect predictions can be updated using actual result data.

Once all of the effects to the proposed changes have been evaluated, the organization can then optionally assess the effects from possible combinations of remedial actions in step 330. For example, the expected results for the actions may be combined, subject to a discount for expected renege effects caused by the combination of the remedies.

As part of the assessment of the remedial actions, the various possible combinations of remedies and their results may be combined into a single visual display, such as a Pugh Matrix, step 340. The decision-matrix method, or Pugh method, is a quantitative technique used to rank the multi-dimensional options of a option set. A basic decision matrix consists of establishing a set of weighted criteria upon which the potential options can be decomposed, scored, and summed to gain a total score which can then be ranked. Morphological analysis is another form of a decision matrix employing a multi-dimensional configuration space linked by way of logical relationships. For example, the possible combinations of actions may be ranked according to their expected effects and the relative costs/difficulty for implementing the changes.

Additionally, the combinations of remedial actions may be further assessed using a control impact matrix that categorized the combination according to their burden the organization as reflected by whether the proposed change was within the control of the organization. The relative control of the actions by the organization are then combined with the expected impact of the changes as described above to categorize the actions. Following the analysis, the various combinations of remedy steps may be ranked in step 350 and a course of action may be selected by the organization, step 360. Then the process 300 may repeat iteratively, using results from one attempted course of action to reduce reneges to assess further efforts.

Figure 4:
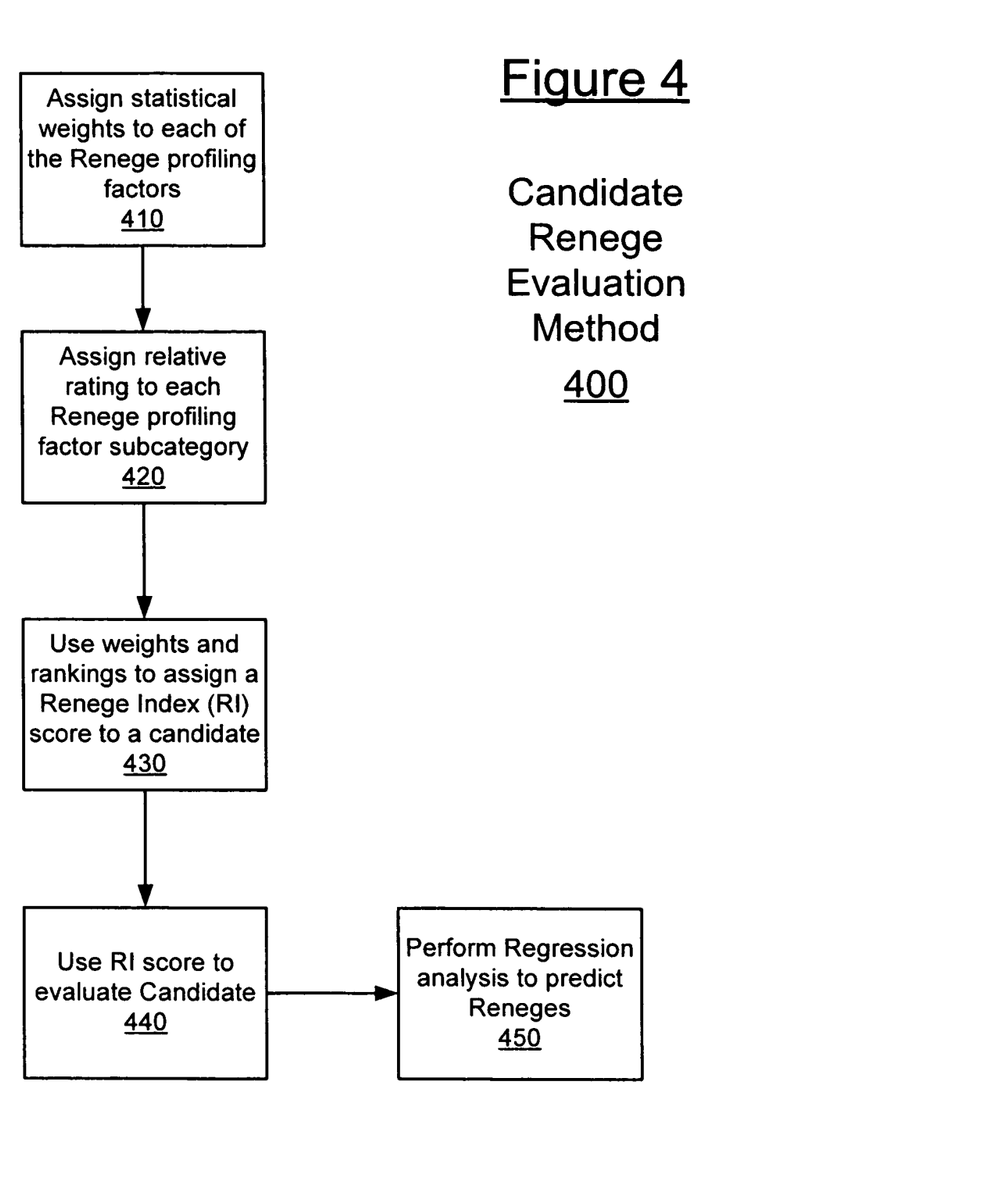
FIG. 4 is a flowchart illustrating the steps in a candidate renege prediction method in accordance with embodiments of the present invention.

Referring back to the candidate renege reduction method 100 depicted in FIG. 1, step 140 entailed evaluating the candidates in view of the data collected from an interview of the candidate in step 13. Turning now to FIG. 4, a candidate evaluation method 400 is described. Each of the profiling factors is assigned a weight as per the observed frequency (OF) during statistical analysis from factor evaluation method 300, step 410. Each Profiling subcategory is then assigned a relative rating based on the relative significance of the particular profiling factor relative to other Profiling factors, step 420. For example, Table 2 below provided exemplary weightings.

TABLE 2

| Factor | Weightage |
| --- | --- |
| Gender | 0.5 |
| Channel | 1 |
| Relocation | 1.5 |
| Career Level | 1 |
| Migrated Joining Location | 2.5 |
| Age Group | 0.5 |
| Education | 1 |
| Previous Organization | 1 |
| Lead Time to join | 1 |
| Salary Index % | 2.5 |

In step 430, a renege index (RI) score is assigned to a candidate by aggregating the relative ratings and weighting for each of the factors. In step 440, the RI score is used to predict whether the candidate will renege an offer.

Continuing with candidate evaluation method 400, a next step is to optionally form a Binary Logistic Regression to derive an equation which would enable users to predict the propensity of an offer-accepting candidate to renege, such as exemplary Eq. 4. A binary logistic regression uses all information captured for the candidate to predict the renege propensity of the individual.

$$K = p/(1-p) = e^{\wedge}(a + b1\text{Gender} + b2(\text{Education Index Level}) + b3(\text{Age}) + b4(\text{Salary Index}))$$ (Eq. 4)

where p=probability of Renege. The exemplary factors included in Eq. 4 are Gender, Education Index, Age and Salary Index. It should be appreciated that one can readily expand Eq. 4 to include other factors, such as those described above, such as in Table 1. Then, one can solve for $p = k/(1+k)$ and convert to a percentage score for a candidate. The percentage score can then be used to evaluate candidates objectively, such as by setting percentage score criteria for hiring.

Figure 5:
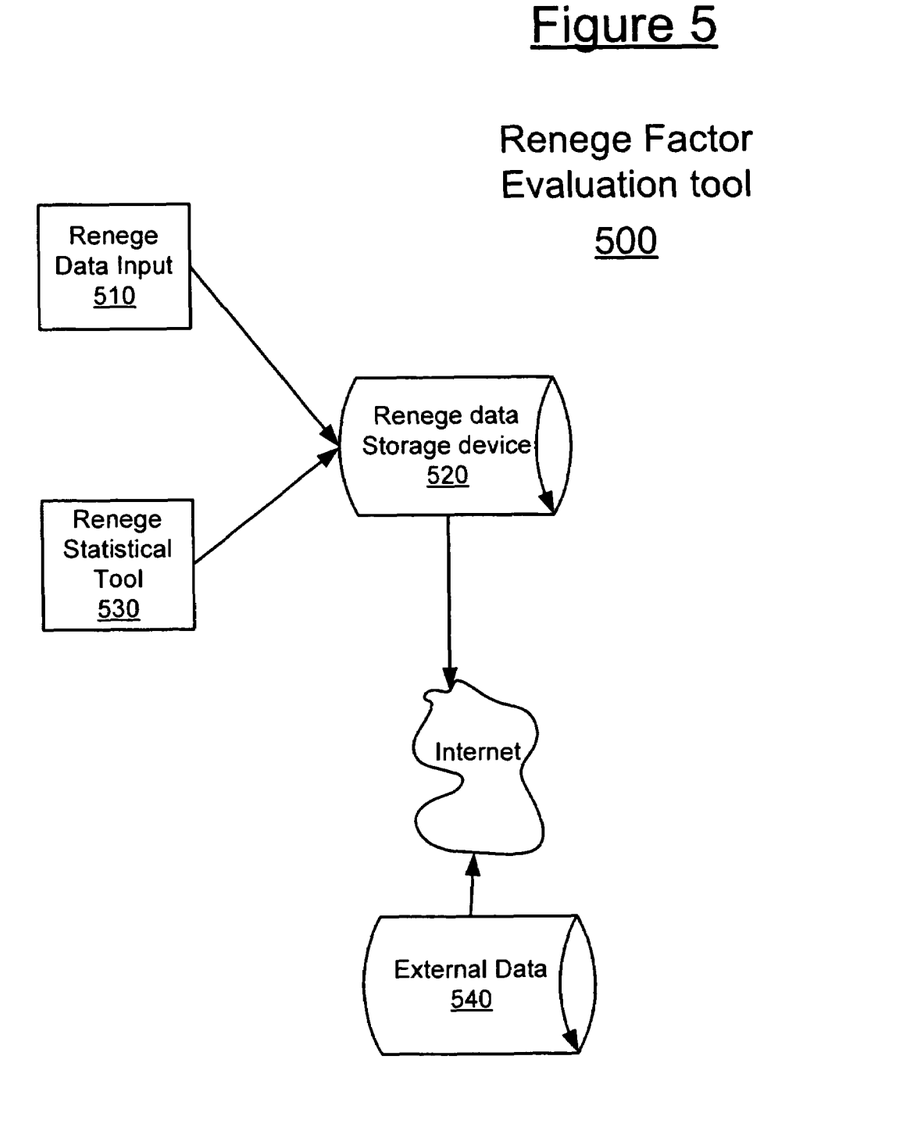
FIG. 5 is a schematic diagram of a psychometric analysis tool for predicting the renege rate for implementing the methods of FIGS. 1-4 in accordance with embodiments of the present invention.

Turning now to FIG. 5, the various methodologies 100, 200, 300, and 400 of the present invention and variations thereof may be implemented using a renege factor system 500. The renege factor system 500 generally includes a renege data input 510 for receiving data relevant to the renege considerations, such as demographic data, job details, information about the organization, and details about other jobs available to the particular candidate. For example, an employer could submit data collected during an interview. Alternatively, an applicant could submit answers to a questionnaire as part of the application process. The employer may further provide data identifying applicants that have reneged/joined the organization so that the data collected from these candidates may be studied as needed by the various renege rate evaluations described herein. The data provide by the renege data input 510 may be stored in a renege data storage device 520.

The stored renege data 520 may then be accessed and used by a renege statistical tool 530 that performance the statistical analysis to determine the set of applicable renege factors, the relative weights and ratings to assign to the factors for the organization. The renege statistical tool 530 may then evaluate a candidate using these data values collected from prior candidates and comparing the fit (or closeness) of the new application to the prior applicants). From this analysis, the candidates can be evaluated either subjectively according to a review of the comparison or objectively by assigning a score based on the relative weights and ratings to assign to the factors.

It should be appreciated that the system 500 may collect data from a remote external source 540, such as demographics/job specifics posted by competing organizations. Similarly, data may be collected from schools, census, industry information, etc. as needed to provide an adequate data set to perform the statistical analysis on the renege factors, as described above

CONCLUSION

While the invention has been described with reference to an exemplary embodiments various additions, deletions, substitutions, or other modifications may be made without departing from the spirit or scope of the invention. Accordingly, the invention is not to be considered as limited by the foregoing description, but is only limited by the scope of the appended claims.

What is claimed:

1. A computer-implemented method for reducing a renege rate of an application, the computer including a processor and memory and the method comprising steps performed by the computer of:

collecting and storing renege data, by the processor, from a plurality of reneges;

determining, by the processor, one or more renege factors based on an analysis of the renege data;

collecting, by the processor, candidate data related to the renege factors, the candidate data being related to a candidate;

determining, by the processor, a weight for each of the renege factors based on a frequency of the renege factor in the renege data;

determining, by the processor, a rating for the renege factors based on a relationship between each of the renege factors, the relationship indicating the relative significance of each renege factor relative to the other renege factors;

assigning, by the processor, a renege index value to each of the renege factors by aggregating the rating and weight; and estimating, by the processor, the propensity of the candidate to renege using a statistical comparison of the candidate data and the stored renege data; and revising, by the processor, the renege factors based on the statistical comparison.

2. The computer-implemented method of claim 1 further comprising the step of updating the stored data with the candidate data.

3. The computer-implemented method of claim 1, wherein the statistical comparison uses the equation:

$$Z = \sum_{i=1}^{k} \left(\frac{X_i - \mu_i}{\sigma_i}\right)^2$$

wherein $X_i$ are k independent, normally distributed random variables with means $\mu_i$ and variances $\sigma_i^2$ and k is the degrees of freedom.

4. The computer-implemented method of claim 1 further comprising the step of selecting the renege factors.

5. The computer-implemented method of claim 4, wherein the selecting of the renege factors comprises the steps of identifying a list of renege factors and determining a statistical relevance of each of the of the identified factors, and choosing renege factors have acceptable statistical relevance.

6. The computer-implemented method of claim 5, wherein a low performing renege factor is removed from the list of renege factors.

7. The computer-implemented method of claim 5 further comprising the step of ranking the renege factors.

8. The computer-implemented method of claim 1 further implementing a renege reduction process.

9. The computer-implemented method of claim 8, wherein the renege reduction process comprises:
    selecting a set of possible renege remedies;
    estimating the renege impact of each of the renege remedies;
    estimating the renege impact of one or more groupings of the renege remedies; and
    depicting effects of the renege remedy groupings.

10. The computer-implemented method of claim 9, the renege reduction process further comprising ranking the groupings the renege remedies.

11. The computer-implemented method of claim 9, the renege reduction process further comprising implementing one of the grouping of the renege remedies.

12. The computer-implemented method of claim 1, wherein:
    each of the renege factors is assigned to a subcategory, and
    the estimating step comprises assigning a relative rating to each subcategory of renege factors.

13. The computer-implemented method of claim 1 further comprising the step of performing regression analysis using the renege factors.

14. A computer program product, tangibly embodied in a non-transitory computer-readable storage medium, for reducing renege rate of an application and containing instructions which, when executed on a processor, perform a method comprising:

collecting and storing renege data from a plurality of reneges;

determining one or more renege factors based on an analysis of the renege data;

collecting candidate data related to the renege factors, the candidate data being related to a candidate;

determining a weight for each of the renege factors based on a frequency of the renege factor in the renege data;

determining a rating for each of the renege factors based on a relationship between each of the renege factors, the relationship indicating the relative significance of each renege factor relative to the other renege factors;

assigning a renege index value to each of the renege factors by aggregating the rating and the weight;

estimating the propensity of the candidate to renege using a statistical comparison of the candidate data and the stored renege data; and revising the one or more renege factors based on the statistical comparison.

15. The computer program product of claim 14 further comprising:
    updating the stored data with the candidate data.

16. The computer program product of claim 14, wherein the statistical comparison uses the equation:

$$Z = \sum_{i=1}^{k} \left(\frac{X_i - \mu_i}{\sigma_i}\right)^2$$

wherein $X_i$ are k independent, normally distributed random variables with means $\mu_i$ and variances $\sigma_i^2$ and k is the degrees of freedom.

17. The computer program product of claim 14 further comprising:
    selecting the renege factors.

18. The computer program product of claim 17, wherein the selecting of the renege factors further includes:
    performing the functions of identifying a list of renege factors;
    determining a statistical relevance of each of the of the identified factors; and choosing renege factors have acceptable statistical relevance.

19. The computer program product of claim 18, wherein a low performing renege factor is removed from the list of renege factors.

20. The computer program product of claim 18 further comprising:
    ranking the renege factors.

21. The computer program product of claim 20 further comprising:
    implementing a renege reduction process.

22. The computer program product of claim 21, wherein implementing the renege reduction process further includes:
    selecting a set of possible renege remedies;
    estimating the renege impact of each of the renege remedies; and
    estimating the renege impact of one or more groupings of the renege remedies.

23. The computer program product of claim 22 further comprising:
    ranking the groups of the renege remedies.

24. The computer program product of claim 23 further comprising:
    implementing one of the grouping of the renege remedies; and measuring the actual results of the remedies.

25. The computer program product of claim 14, wherein:
each of the renege factors is assigned to a subcategory, and
the estimating further includes assigning a relative rating to each subcategory of renege factors.

26. The computer program product of claim 14 further comprising:
performing regression analysis using the renege factors.

\* \* \* \* \*

UNITED STATES PATENT AND TRADEMARK OFFICE
CERTIFICATE OF CORRECTION

PATENT NO. : 8,676,717 B2  
APPLICATION NO. : 11/512419  
DATED : March 18, 2014  
INVENTOR(S) : Mallesh Tigali et al.

Page 1 of 1

It is certified that error appears in the above-identified patent and that said Letters Patent is hereby corrected as shown below:

In the Claims

Claim 5, Col. 9, Line 33, "have" should read as --that have--.

Claim 11, Col. 9, Line 54, "grouping of" should read as --groupings of--.

Claim 18, Col. 10, Line 43, "have" should read as --that have--.

Claim 24, Col. 10, Line 66, "grouping of" should read as --groupings of--.

Signed and Sealed this  
Twenty-ninth Day of July, 2014

Michelle K. Lee  
*Deputy Director of the United States Patent and Trademark Office*